US012460455B2

(12) United States Patent
Svoboda

(10) Patent No.: US 12,460,455 B2
(45) Date of Patent: Nov. 4, 2025

(54) LOCK ARRANGEMENT—IN PARTICULAR, FOR AN ENGINE HOOD OF A VEHICLE

(71) Applicant: WITTE Automotive GmbH, Velbert (DE)

(72) Inventor: Miroslav Svoboda, Plzen (CZ)

(73) Assignee: Witte Automotive GmbH, Velbert (DE)

( * ) Notice: Subject to any disclaimer, the term of this patent is extended or adjusted under 35 U.S.C. 154(b) by 92 days.

(21) Appl. No.: 18/186,988

(22) Filed: Mar. 21, 2023

(65) Prior Publication Data

US 2023/0295965 A1 Sep. 21, 2023

(30) Foreign Application Priority Data

Mar. 21, 2022 (DE) ..................... 10 2022 202 736.1

(51) Int. Cl.
*E05B 79/20* (2014.01)
*E05B 79/22* (2014.01)
*E05B 83/24* (2014.01)

(52) U.S. Cl.
CPC ............ *E05B 83/243* (2013.01); *E05B 79/20* (2013.01); *E05B 79/22* (2013.01)

(58) Field of Classification Search
CPC ........ E05B 83/243; E05B 83/24; E05B 83/28; E05B 79/20; E05B 79/22; E05B 85/245
See application file for complete search history.

(56) References Cited

U.S. PATENT DOCUMENTS 2,246,789 A * 6/1941 Dall ........................ E05B 83/16 292/99
2,256,465 A 9/1941 Brubaker
3,397,906 A 8/1968 Beckman et al.
5,738,393 A * 4/1998 Chao ........................ E05B 83/24 292/216
6,422,616 B1 * 7/2002 Wortmann .............. E05B 83/24 292/216
6,547,291 B1 * 4/2003 Schwaiger .............. E05B 83/16 292/216

FOREIGN PATENT DOCUMENTS

CN 207392952 U 5/2018
DE 102007003292 A1 7/2008
JP 2015009580 A 1/2015
KR 20180069265 A 6/2018

OTHER PUBLICATIONS

German Patent Office, Office Action in Application No. DE 10 2022 202 736.1, dated Nov. 17, 2022, 5 pages, Munich, Germany.

* cited by examiner

*Primary Examiner* — Kristina R Fulton
*Assistant Examiner* — Thomas L Neubauer
(74) *Attorney, Agent, or Firm* — Marshall & Melhorn, LLC

(57) ABSTRACT

A lock arrangement may have a claw for a locking element, a safety catch for the locking element, and a pawl which interacts with the safety catch. The safety catch may be mounted on a first bearing bolt so as to be rotatable about a first axis of rotation. The pawl may be mounted on a second bearing bolt so as to be rotatable about a second axis of rotation. The safety catch may have a base body having a recess which receives the second bearing bolt such that the second bearing bolt is arranged in the recess. When the safety catch is pivoted, the recess is movable or is moved relative to the second bearing bolt.

13 Claims, 7 Drawing Sheets

LOCK ARRANGEMENT—IN PARTICULAR, FOR AN ENGINE HOOD OF A VEHICLE

FIELD

The invention relates to a lock arrangement—in particular, for an engine hood or a tailgate of a vehicle.

BACKGROUND

A lock arrangement of the type mentioned at the outset is used, for example, in motor vehicles for locking engine hoods, backrests, doors, hoods, tailgates, trunk lids, or the like, and is known for example from U.S. Pat. No. 2,256,465 A, DE 10 2007 003 292 A1, U.S. Pat. No. 3,397,906 A, or U.S. Pat. No. 5,738,393 A. To unlock the lock arrangement, a locking mechanism formed from a blocking pawl, a rotary catch, and a locking element is moved by means of an actuating drive, e.g., a servomotor, or manually in order to adjust the pawl from a locked position to an unlocked position. In the unlocked position of the blocking pawl, the rotary catch is released so that it can be opened from a closed position into an open position and so that the locking element, e.g., a locking retainer, is released.

The object of the invention is to provide an improved lock arrangement which is constructed in a simple manner and has a stable structure with respect to mechanical stress.

The object is achieved according to the invention by a lock arrangement having the features of the claims.

The dependent claims relate to advantageous embodiments of the invention.

SUMMARY

According to the invention, the object is achieved by a lock arrangement—in particular, for an engine hood or a tailgate of a vehicle—wherein the lock arrangement comprises at least one claw for a locking element—in particular, a locking bolt or a locking bracket—a safety catch for the locking element, and a pawl which interacts with the safety catch, wherein the safety catch is mounted on a first bearing bolt or first bearing pin so as to be rotatable about a first axis of rotation, and the pawl is mounted on a second bearing bolt or bearing pin so as to be rotatable about a second axis of rotation, wherein the safety catch has a base body which has a recess which receives the second bearing bolt, such that the second bearing bolt is arranged in the recess, wherein the recess is movable or is moved relative to the second bearing bolt when the safety catch is pivoted.

The advantages achieved by the invention are in particular that the pivoting movement of the safety catch is guided, and in particular positively guided, by means of the second bearing bolt guided in the recess.

A further development provides that, in a secured position of the lock arrangement in which the claw is open and the locking element is held securely by means of the safety catch, a force acting on the locking element can be diverted in a divided manner to the first bearing bolt and the second bearing bolt. On account of these two bearing points and the division of a force possibly acting on the locking element—in particular, a tensile force of the engine hood or tailgate coupled to the locking element—in the case of contact between the claw and safety catch, the lock arrangement, even in the secured position, is constructed so as to be sufficiently stable against mechanical stress.

A further aspect provides that the recess comprise at least one first end stop and one second end stop for pivoting the safety catch between a first end position and a second end position. For example, the recess is designed in the shape of a circular arc.

In a further embodiment of the invention, in a closed position of the lock arrangement, in which the claw and the locking element are coupled in a closing manner, the second bearing bolt is arranged on the first end stop. This first end stop limits the pivoting movement of the safety catch into the closed position.

In a further embodiment of the invention, in the secured position of the lock arrangement in which the claw is open and the locking element is held securely by means of the safety catch, the second bearing bolt is arranged on the second end stop. This second end stop limits the pivoting movement of the safety catch into the secured position.

In a further embodiment of the invention, a grip element is provided for opening the lock arrangement, by means of which grip element the safety catch can be brought into an open position. The manual grip element is motion-coupled to the safety catch by means of a Bowden cable, for example.

A further aspect provides that the safety catch be folded by the closing element into the closed position of the lock arrangement. As a result, the safety catch is securely held in the closed position.

In a further embodiment of the invention, the safety catch can be brought in a spring-assisted manner into the secured position when the lock arrangement is opened. In this case, the pivoting movement—in particular, the deployment movement—of the safety catch into the secured position is limited by the second bearing bolt and the second end stop. For example, a spring element is arranged between the claw and the safety catch. In this case, the safety catch can be biased, in the closed position of the lock arrangement, into the secured position, via the spring element—in particular, a leg spring or torsion spring—counter to the pivoting direction of the pivoting movement. As a result, the pivoting movement or the deployment movement of the safety catch from the closed position into the secured position is continuously spring-assisted.

DESCRIPTION OF THE FIGURES

Embodiments of the invention are explained in greater detail with reference to the drawings. In the figures.

DETAILED DESCRIPTION

Parts corresponding to one another are provided with the same reference signs in all the drawings.

Figure 1:
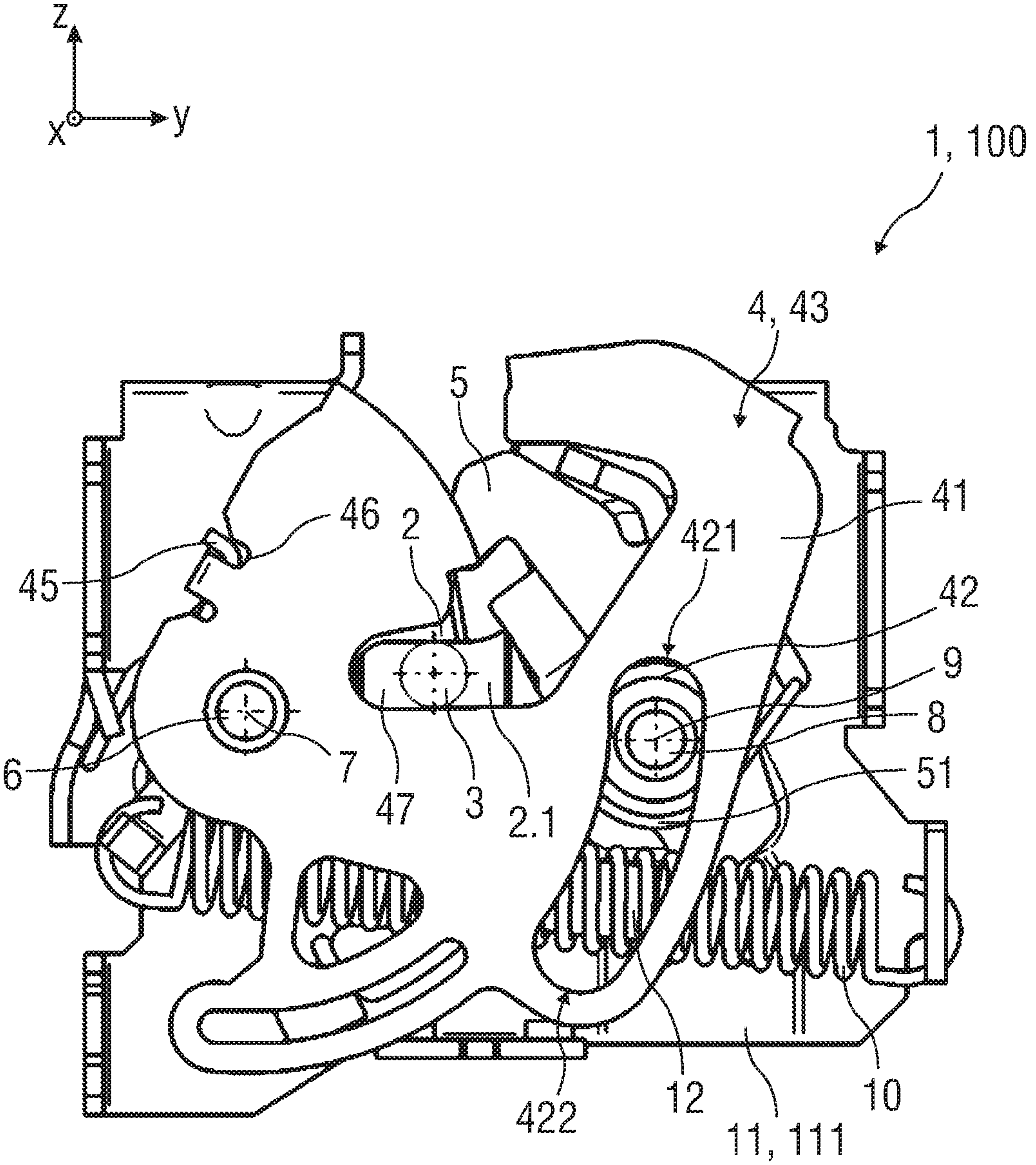
FIG. 1 is a schematic plan view of a lock arrangement having two bearing points.

FIG. 1 is a schematic plan view of a lock arrangement 1 for, for example, an engine hood or a tailgate of a vehicle in a closed position 100.

In the assembled state, the lock arrangement 1 is designed as an assembly unit. In this case, all the components of the lock arrangement 1 are mechanically coupled and connected to one another. The lock arrangement 1 can be designed manually or electrically, and in particular electromotively.

The lock arrangement 1 having a manual opening mechanism is described below.

The lock arrangement 1 comprises at least one claw 2 for a locking element 3, a safety catch 4 for the locking element 3, a pawl 5 interacting with the safety catch 4. The locking element 3 is in the closed position 100, in that the locking element 3 and the claw 2 are coupled in a closed manner.

The safety catch 4 is mounted on a first bearing bolt 6 or bearing pin so as to be rotatable about a first axis of rotation 7. The pawl 5 is mounted on a second bearing bolt 8 or bearing pin so as to be rotatable about a second axis of rotation 9.

The safety catch 4 has at least one base body 41 having a recess 42. The recess 42 receives the second bearing bolt 8, such that the second bearing bolt 8 is arranged in the recess 42, wherein the recess 42 is movable or is moved relative to the second bearing bolt 8 when the safety catch 4 is pivoted.

The first bearing bolt 6 and the second bearing bolt 8 serve, in a secured position 101 of the lock arrangement 1, as bearing points.

The claw 2 is, for example, a rotary catch or hook-shaped claw 2 for the locking element 3 in the closed position 100—in particular, for holding the locking element 3 securely in the closed position 100.

The locking element 3 is designed, for example, as a locking bolt or a U-shaped locking bracket.

Figure 6:
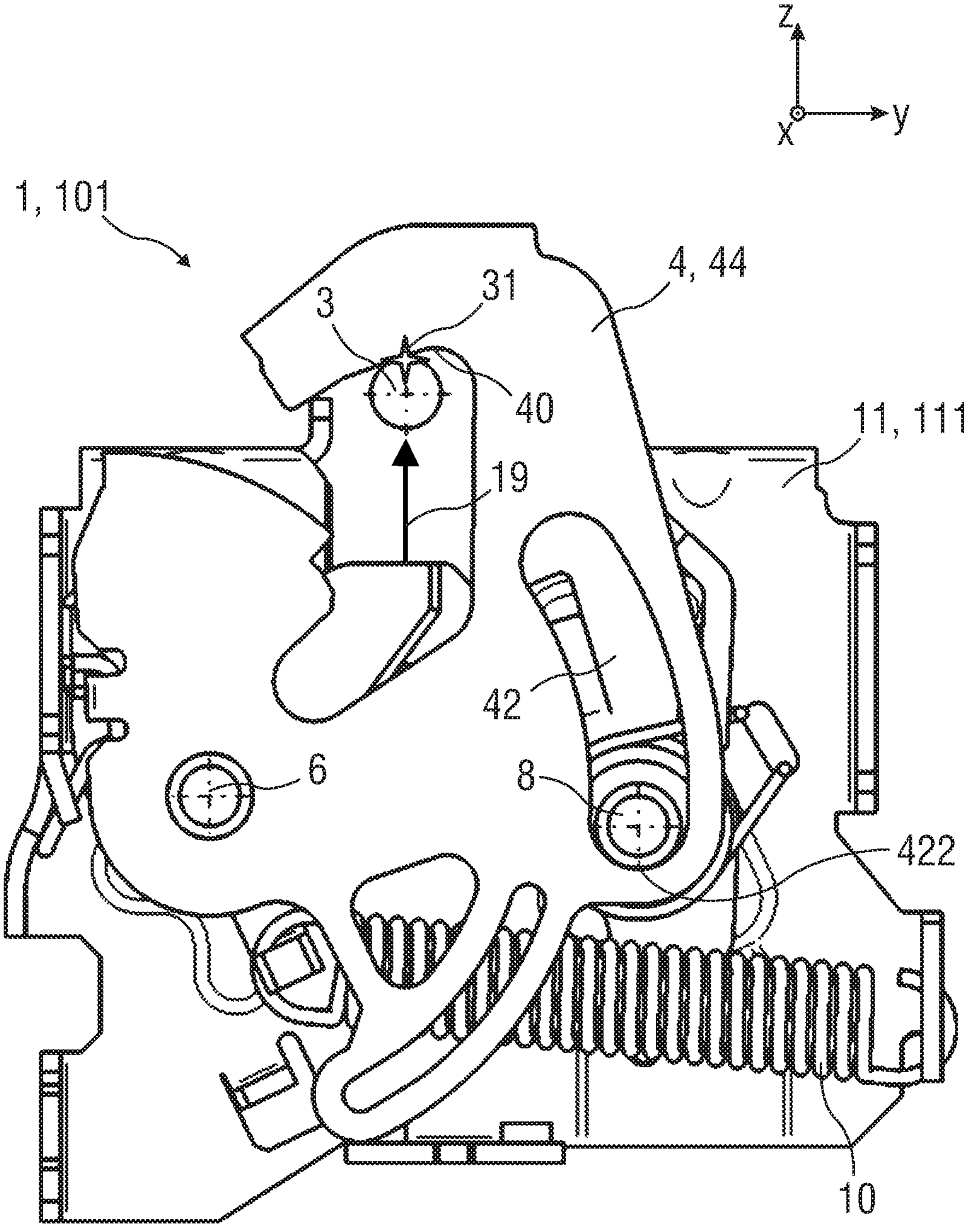
FIG. 6 is a schematic plan view of the lock arrangement in a secured position.
Figure 7:
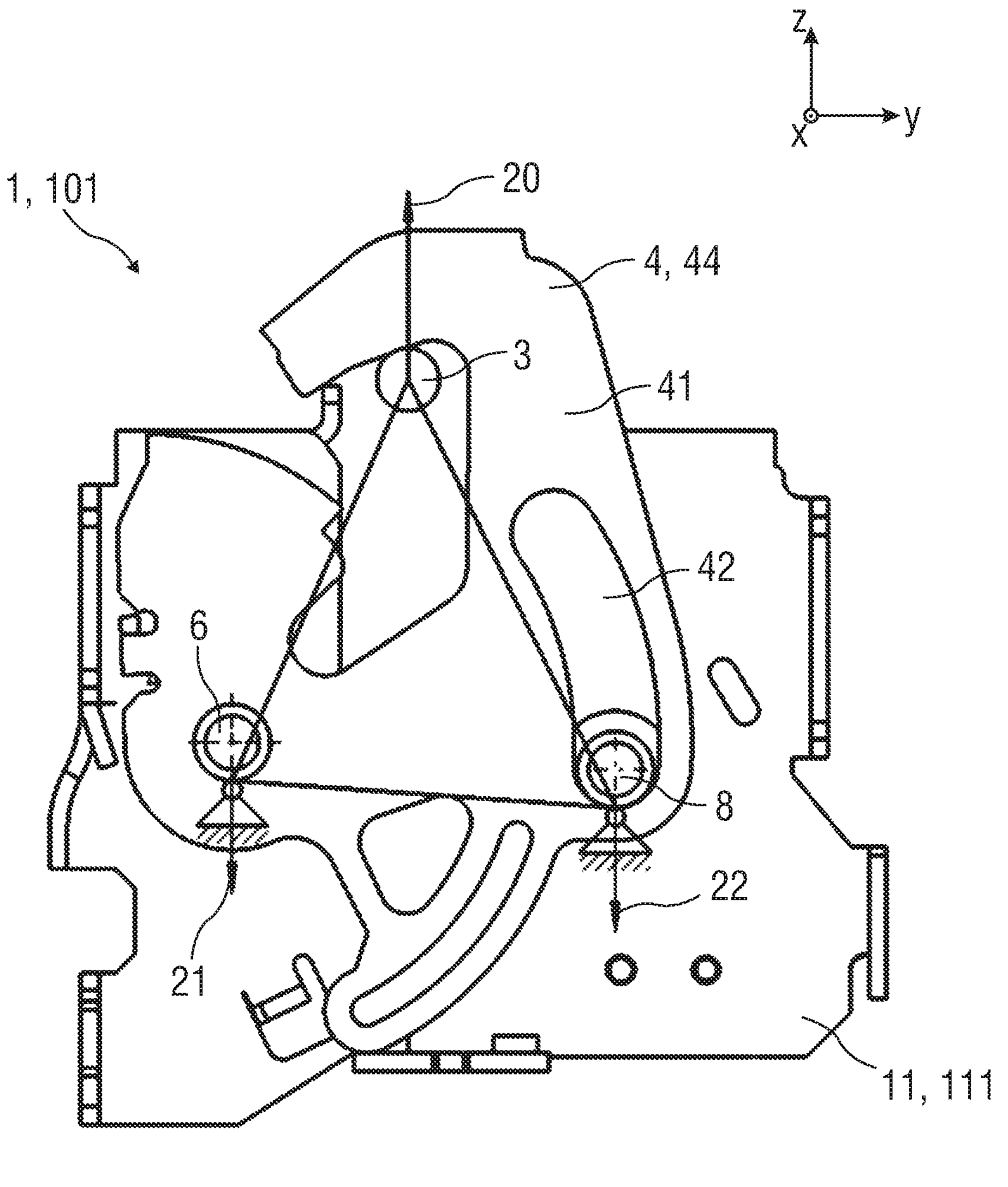
FIG. 7 is a schematic plan view of the lock arrangement in the secured position according to FIG. 6 and having the division of the acting force onto the two bearing points.

The safety catch 4 is in particular a rotary catch or a hook-shaped safety element for the locking element 3—in particular, for catching and securely holding the locking element 3 in the secured position 101 (shown in FIGS. 6 and 7).

The pawl 5 is in particular a locking mechanism for the claw 2, in order to block said claw in the closed position 100 of the lock arrangement 1 against unintentional opening.

Figure 5:
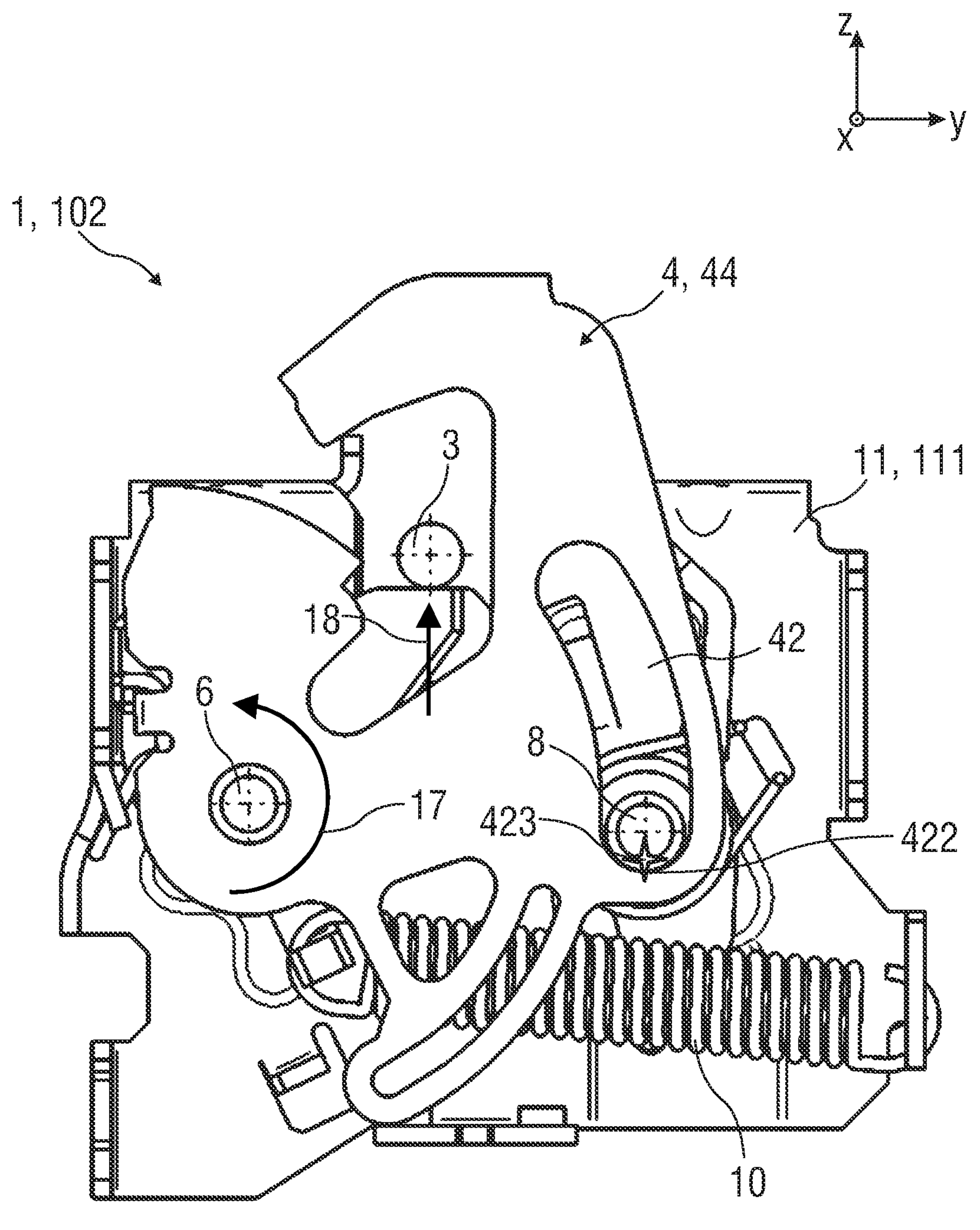
FIG. 5 is a schematic plan view of the lock arrangement in a partially open position.

The recess 42 comprises at least one first end stop 421 and one second end stop 422 for pivoting the safety catch 4 between a first end position 43 (shown in FIGS. 1 and 2) and a second end position 44 (shown in FIGS. 5 through 7). The recess 42 is in the form of a circular arc, for example.

In the closed position 100, the claw 2 (also called a rotary catch) and the locking element 3 are coupled in a locking manner. For example, the claw 2 has a hook-shaped recess 2.1 in which the locking element 3 is held.

In the closed position 100 of the lock arrangement 1 (=closed state of the lock arrangement 1), in which the claw 2 and the locking element 3 are coupled in a locking manner, the second bearing bolt 8 is arranged on the first end stop 421 or in the region of the first end stop 421.

Furthermore, the claw 2 and the locking element 3 are blocked against unlocking by means of the pawl 5. For this purpose, for example the outer contours of the claw 2 and the pawl 5 are in a releasable, force-fitting connection, and in particular a friction connection.

Furthermore, the safety catch 4 is placed—in particular, folded or pivoted—by the locking element 3 into the closed position 100 of the lock arrangement 1. For this purpose, the safety catch 4 comprises a slot-shaped opening 47 in which the locking element 3 is arranged such that it places the safety catch 4 into the first end position 43 and holds it there. This placement movement is limited by the interaction of the first end stop 421 and the second bearing bolt 8. In this first end position 43, the safety catch 4 is pivoted away from the secured position 101.

In addition, a deployment spring 10 is provided, which is hinged at one end to a lock carrier 11, and at the opposite end to the claw 2. By means of the deployment spring 10, which is tensioned in the closed position 100 of the lock arrangement 1, the claw 2 is deployed, and in particular pivoted open, in a spring-assisted manner, when the lock arrangement 1 is opened.

Figure 3:
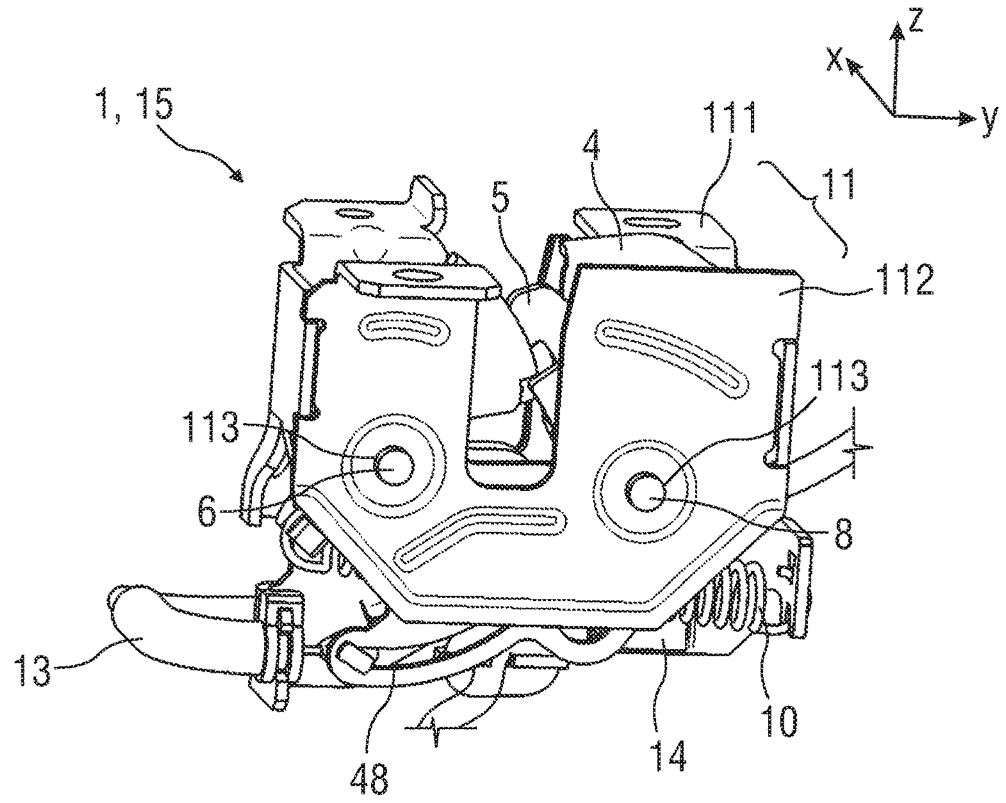
FIG. 3 is a schematic plan view of the lock arrangement having two bearing points and a lock housing partially surrounding these.
Figure 4:
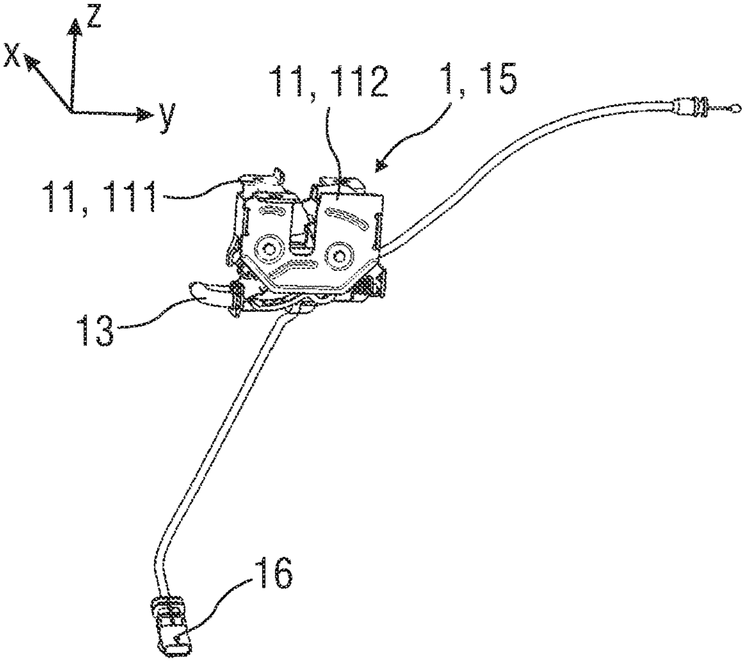
FIG. 4 is a schematic, perspectival view of the lock arrangement according to FIG. 3, having a manual grip element and Bowden cable for opening the lock arrangement.

The lock carrier 11 can in particular be constructed in multiple parts. FIGS. 1, 2 and 5 through 8 in each case show only one first carrier part 111. FIGS. 3 and 4 show the lock carrier 11 in the assembled state, having the first carrier part 111 and a second carrier part 112. The first carrier part 112 is not shown in FIGS. 1 and 2.

Furthermore, the lock arrangement 1 can comprise a damper 12. The damper 12 serves to reduce or prevent the noise of the deployment spring 10 during a confirmation—in particular, during the deployment movement of the claw 2. For this purpose, the damper 12 is formed within the deployment spring 10, designed as a coil spring. The coil spring is in particular designed as a tension spring.

A pawl spring 51 is assigned to the pawl 5. The pawl spring 51 is, for example, a leg spring. The pawl spring 51 is designed in particular as a return element for the pawl 5. The pawl spring 51 is hinged at one end to the pawl 5 and at the other end to the first carrier part 111.

A spring element 45 is assigned to the safety catch 4. The spring element 45 is, for example, a leg spring. The spring element 45 is in particular designed as a deployment element for the safety catch 4. The spring element 45 is hinged at one end to the safety catch 4 and at the other end to the first carrier part 111. The spring element 45 can in particular be arranged between the claw 2 and the safety catch 4—for example, on the first bearing bolt 6. FIG. 1 shows the free spring end, hinged to the safety catch 4, of the spring element 45. For this purpose, the safety catch 4 comprises a spring receptacle 46.

Figure 2:
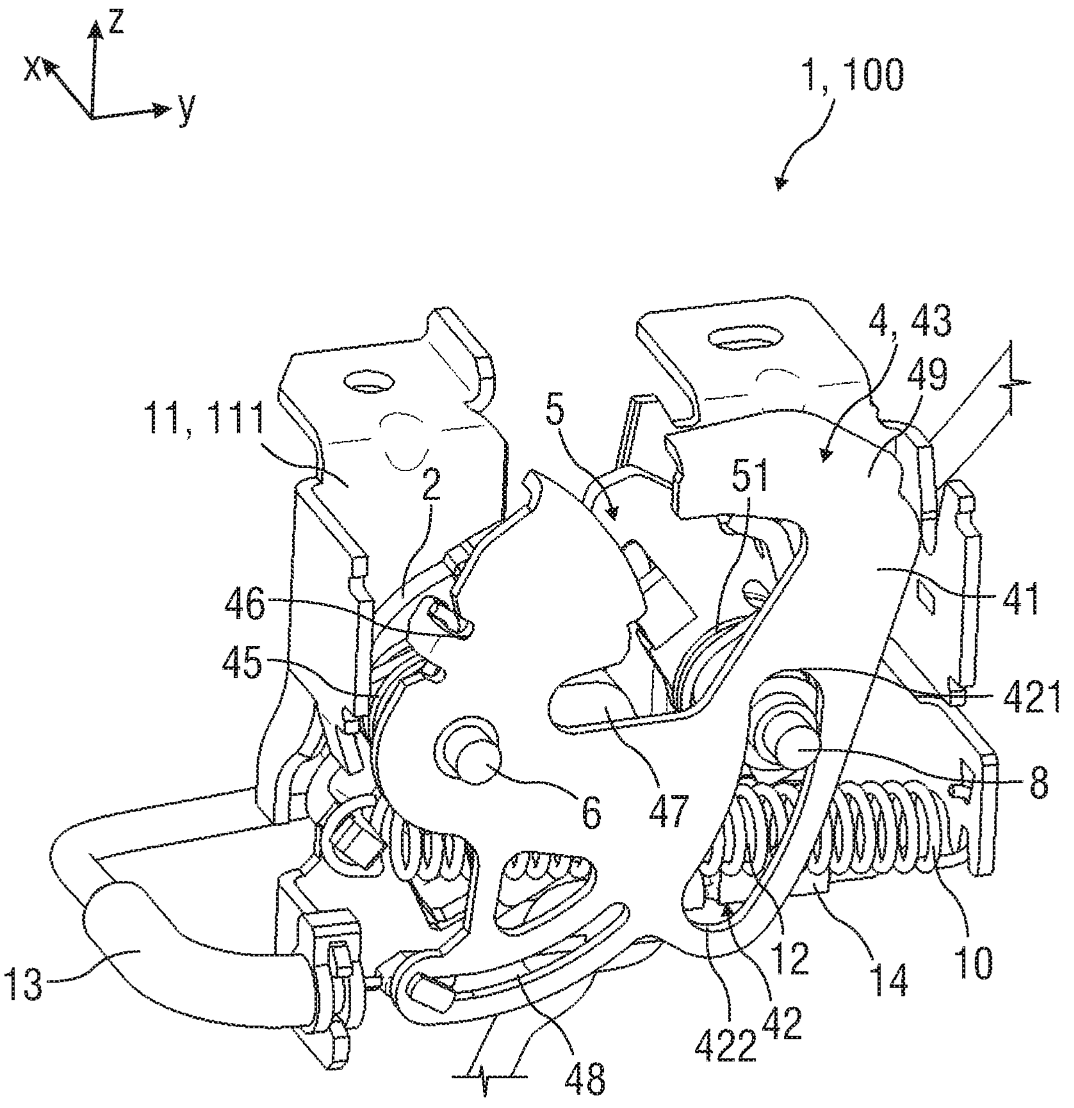
FIG. 2 is a schematic, perspectival view of the lock arrangement having two bearing points.

FIG. 2 is a schematic, perspectival view of the lock arrangement 1 having the bearing bolts 6 and 8, which are designed as two bearing points, and the safety catch 4 having the recess 42.

In order to open the lock arrangement 1, a force transmission element 13 is provided, which is coupled to the safety catch 4. For this purpose, the safety catch 4 comprises a corresponding receptacle 48. The force transmission element 13 is, for example, a Bowden cable.

By means of the force transmission element 13, an opening force, generated at a grip element (not shown) for manually opening the lock arrangement 1, or generated by an electric drive element (not shown), is transmittable to the safety catch 4 in order to place the safety catch 4 from the secured position 101 into an open position 49 of the safety catch 4, as is shown for example in FIG. 2. The safety catch 4 thus opens, and the locking element 3 is released, such that the lock arrangement 1 is opened, and the moving element coupled to the locking element 3, such as the engine hood or the trunk hatch, opens.

In addition, the lock arrangement 1 can comprise a microswitch 14. The microswitch 14 serves in particular to display the open lock arrangement 1—in particular, the open pawl 5 or the open latch. The microswitch 14 monitors in particular the position of the pawl 5. When the pawl 5 opens, the microswitch 14 switches into a defined pawl position and thus displays an open engine hood, for example, on the dashboard of the vehicle.

FIG. 3 is a schematic plan view of the lock arrangement 1 having the two bearing bolts 6 and 8, designed as bearing points, and the lock carrier 11, and without a locking element 3.

The lock carrier 11 comprises the carrier parts 111 and 112, which are assembled and surround the components of the lock arrangement 1, at least in part. The lock carrier 11 forms a lock housing, at least in part.

The second carrier part 112 comprises two through-openings 113, through which the two bearing bolts 6 and 8 project in the assembled state of the lock arrangement 1.

The lock arrangement 1, having the partially surrounding lock carrier 11, can be pre-assembled without the closing element 3 to form an assembly module 15.

FIG. 4 is a perspectival view of the lock arrangement 1 having a plug 16 for the microswitch 14 and the force transmission element 13 for opening the lock arrangement 1—in particular, the safety catch 4.

FIG. 5 is a schematic plan view of the lock arrangement 1 in a partially open position 102. This partially open position 102 is not a fixed position, but only a snapshot during the opening of the claw 2 for releasing the locking element 3.

The safety catch 4 (also called safety hook or rotary catch) rotates according to arrow 17, due to the torque of the associated spring element 45, about the first bearing bolt 6, e.g., a bearing pin or bearing rivet, until the second bearing bolt 8 strikes the second end stop 422 in the recess 42. In other words, the deployment movement—in particular, pivoting movement according to arrow 17—of the safety catch 4 is determined by the second bearing bolt 8 and the shape of the recess 42 in the safety catch 4.

The locking element 3, e.g., a locking bolt or a locking bracket, is moved according to arrow 18 from the closed position 101 into a folded-up position.

During the positioning of the lock arrangement 1 into the partially open position 102 (shown in FIG. 5) and/or into the secured position 101 (shown in FIGS. 6 and 7), the second bearing bolt 8 comes into abutment 423 against the second end stop 422. At the latest in the secured position 102, the second bearing bolt 8 is in abutment against the second end stop 422.

In this case, as described above, the safety catch 4 is brought in a spring-assisted manner into the secured position 101. The deployment movement—in particular, pivoting movement—of the safety catch 4 is limited by the abutment of the second bearing bolt 8 against the second end stop 422.

The first bearing bolt 6 of the safety catch 4 can serve as a claw bearing of the claw 2. The second bearing bolt 8 of the safety catch 4 can serve as a pawl bearing of the pawl 5.

FIG. 6 is a schematic plan view of the lock arrangement 1 in the secured position 101, in which the claw 2 is open, and the locking element 3 is held secured by means of the safety catch 4. In this case, the locking element 3 arrives at a catch stop 31 on a catch receptacle 40 of the safety catch 4. The catch receptacle 40 is hook-shaped.

The locking element 3, e.g., a locking bolt or a locking bracket, is placed from the folded-up position into the secured position 101 of the lock arrangement 1, according to arrow 19. In the secured position 101, the locking element 3 is held secured by the catch receptacle 40 of the deployed safety catch 4, as shown in FIGS. 6 and 7.

FIG. 7 is a schematic plan view of the lock arrangement 10 in the secured position 101 according to FIG. 6, and having a division of a force 20 acting on the locking element 3—in particular, a tensile force—onto the two bearing bolts 6 and 8 designed as bearing points. In this case, the force 20 is divided into two partial forces 21, 22 and diverted to the two bearing bolts 6 and 8.

The locking element 3 is captured by the catch receptacle 40—in particular, a catch contour—of the safety catch 4. In this case, forces 20, and in particular tensile forces, acting on the locking element 3 can result, due to a movable element, such as the hood or the tailgate, which is coupled to the locking element 3.

This force 20 is distributed, in the secured position 101, onto the two support surfaces of the first bearing bolt 6 and of the second bearing bolt 8, via which the partial forces 21 and 22 can be diverted.

Figure 8:
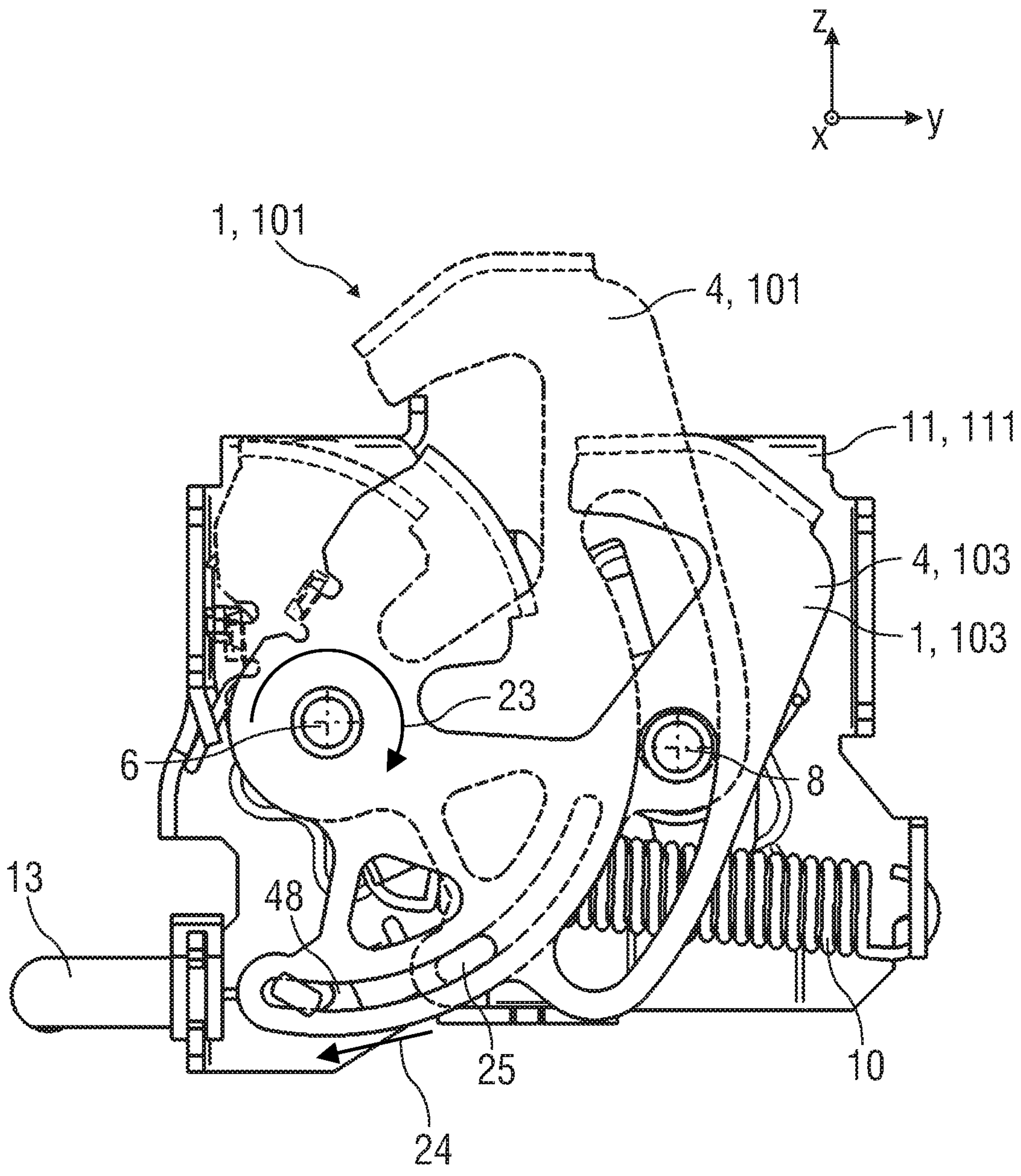
FIG. 8 is a schematic, partially transparent plan view of the lock arrangement in the secured position before an opening of the lock arrangement.

FIG. 8 is a schematic, partially transparent, plan view of the lock arrangement 1 in the secured position 101 (shown in dashed lines) and of an opening movement of the safety catch 4 about the first bearing bolt 6 according to arrow 23 into an open position 103 of the safety catch 4, and thus of the lock arrangement 1 (shown by a solid line).

In order to open the lock arrangement 1, the safety catch 4 can be opened manually or electrically by actuating the force transmission element 13. The opening movement of the safety catch 4 can be carried out, according to arrow 24, guided by a pin 25, in the receptacle 48 of the safety catch 4.

LIST OF REFERENCE SIGNS

1 lock arrangement
100 closed position
101 secured position
102 partially open position
103 open position
2 claw
2.1 receptacle
3 locking element
4 safety catch
40 catch receptacle
41 base body
42 recess
421 first end stop
422 second end stop
423 stop
43 first end position
44 second end position
45 spring element
46 spring receptacle
47 slot-shaped opening
48 receptacle
49 open position
5 pawl
51 pawl spring
6 first bearing bolt
7 first axis of rotation
8 second bearing bolt
9 second axis of rotation
10 deployment spring
11 lock carrier
111 first carrier part
112 second carrier part

113 through-opening
12 damper
13 force transmission element
14 microswitch
15 assembly module
16 plug
17 arrow
18 arrow
19 arrow
20 force
21, 22 partial force
23 arrow
24 arrow
25 pin

The invention claimed is:

1. A lock arrangement, comprising:
a claw for a locking element,
a safety catch for the locking element,
a pawl which interacts with the safety catch,
wherein the safety catch is mounted on a first bearing bolt so as to be rotatable about a first axis of rotation, and
the pawl is mounted on a second bearing bolt so as to be rotatable about a second axis of rotation, and
wherein the safety catch has a base body having a recess which receives the second bearing bolt, such that the second bearing bolt is arranged in the recess,
wherein, when the safety catch is pivoted, the recess is movable or is moved relative to the second bearing bolt, and
wherein the claw is laterally offset from the safety catch along the first bearing bolt.

2. The lock arrangement according to claim 1, wherein, in a secured position of the lock arrangement, in which the claw is open and the locking element is held secured by the safety catch, a force acting on the locking element is diverted in a divided manner to the first bearing bolt and the second bearing bolt.

3. The lock arrangement according to claim 2, wherein the recess comprises one first end stop and one second end stop for pivoting the safety catch between a first end position and a second end position.

4. The lock arrangement according to claim 3, wherein, in a closed position of the lock arrangement, in which the claw and the locking element are coupled in a locking manner, the second bearing bolt is arranged on the first end stop.

5. The lock arrangement according to claim 3, wherein, in the secured position of the lock arrangement, in which the claw is open and the locking element is held secured by the safety catch, the second bearing bolt is arranged on the second end stop.

6. The lock arrangement according to claim 1, wherein the recess is designed in the shape of a circular arc.

7. The lock arrangement according to claim 1, wherein a grip element is provided for opening the lock arrangement, wherein via the grip element the safety catch can be brought into an open position.

8. The lock arrangement according to claim 1, wherein the safety catch is placed by the locking element into the closed position of the lock arrangement.

9. The lock arrangement according to claim 2, wherein the safety catch can be brought in a spring-assisted manner into the secured position.

10. The lock arrangement according to claim 1, wherein a spring element is arranged between the claw and the safety catch.

11. The lock arrangement according to claim 1, wherein the safety catch is adapted to catch and hold the locking element.

12. The lock arrangement according to claim 1, wherein the pawl is a locking mechanism for the claw to block the claw in a closed position against unintentional opening.

13. The lock arrangement according to claim 1, wherein in a secured position in which the claw is open, the locking element is secured by the safety catch.

* * * * *